US011447010B2

(12) United States Patent
Di Censo et al.

(10) Patent No.: US 11,447,010 B2
(45) Date of Patent: Sep. 20, 2022

(54) PASSENGER INFOTAINMENT SYSTEM

(71) Applicant: Faurecia Automotive Seating, LLC, Auburn Hills, MI (US)

(72) Inventors: Davide Di Censo, Sunnyvale, CA (US); Cedric Ketels, Mountain View, CA (US); Robert C. Fitzpatrick, Auburn Hills, MI (US); Thomas Dessapt, Sunnyvale, CA (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 354 days.

(21) Appl. No.: 16/702,831

(22) Filed: Dec. 4, 2019

(65) Prior Publication Data
US 2021/0170871 A1  Jun. 10, 2021

(51) Int. Cl.
*B60K 35/00* (2006.01)
*B60R 11/02* (2006.01)
*B60R 11/00* (2006.01)

(52) U.S. Cl.
CPC .......... *B60K 35/00* (2013.01); *B60R 11/0235* (2013.01); *B60K 2370/1438* (2019.05); *B60K 2370/164* (2019.05); *B60K 2370/577* (2019.05); *B60K 2370/739* (2019.05); *B60K 2370/77* (2019.05); *B60R 2011/0015* (2013.01)

(58) Field of Classification Search
CPC .............. B60K 35/00; B60K 2370/577; B60R 11/0235
See application file for complete search history.

(56) References Cited

U.S. PATENT DOCUMENTS

| 6,724,317 | B1 | 4/2004 | Kitano | |
|---|---|---|---|---|
| 7,048,163 | B2 | 5/2006 | Albert | |
| 9,494,980 | B2 | 11/2016 | Corbin | |
| 9,527,456 | B2 | 12/2016 | Ackeret | |
| 2004/0145684 | A1 | 7/2004 | Albert | |
| 2010/0333146 | A1 | 12/2010 | Pickney | |
| 2016/0210110 | A1* | 7/2016 | Feldman | G06F 3/165 |
| 2017/0048368 | A1* | 2/2017 | Köhnke | H04W 4/80 |
| 2017/0188395 | A1* | 6/2017 | Kim | H04W 4/40 |
| 2018/0069930 | A1* | 3/2018 | Brusco | H04M 9/00 |
| 2018/0265039 | A1* | 9/2018 | Jain | G07C 9/00309 |
| 2021/0170871 | A1* | 6/2021 | Di Censo | B60K 35/00 |

OTHER PUBLICATIONS

BMW Connected Drive—2017.*

* cited by examiner

*Primary Examiner* — David E Choi
(74) *Attorney, Agent, or Firm* — Barnes & Thornburg LLP

(57) ABSTRACT

An infotainment system may include at least one display mounted to a vehicle seat, a connectivity module that operably couples the infotainment system to at least one mobile device, and a plurality of passenger-focused modules. The at least one display may mirror a display of the at least one mobile device, and the passenger-focused modules may operate in response to the at least one mobile device via the connectivity module.

15 Claims, 5 Drawing Sheets

PASSENGER INFOTAINMENT SYSTEM

BACKGROUND

The present disclosure relates to in-vehicle entertainment, and more particularly, to rear infotainment systems.

SUMMARY

According to an aspect of the present disclosure, an infotainment system includes at least one display mounted to a vehicle seat.

In illustrative embodiments, the infotainment system further comprises a connectivity module that operably couples the infotainment system to at least one mobile device, and a plurality of passenger-focused modules.

In illustrative embodiments, the at least one display mirrors a display of the at least one mobile device, and the passenger-focused modules operate in response to the at least one mobile device via the connectivity module.

In illustrative embodiments, a secondary display may be configured as a behind-surface display. Also, the secondary display provides at least one of trip information, charging information, and horizon information. Further in accordance with this aspect, the secondary display implements a motion sickness mitigation graphic.

In illustrative embodiments, the infotainment system also may include one or more lighting elements, one or more audio transducers, and one or more ventilation elements. The at least one mobile device controls, in accordance with this aspect, the at least one additional feature through a wireless connection established by the connectivity module. The connectivity module further establishes a connection with at least one vehicle-level system. Examples also include the at least one mobile device controlling both the at least one additional feature and the at least one vehicle-level system.

In illustrative embodiments, a passenger connectivity device includes a display mounted on a seat, a connectivity module that operatively connects a personal mobile device to the display, a behind-surface display disposed about the display, and at least one processor that operates to mirror the personal mobile device on the display and present multimedia on the behind-surface display.

In illustrative embodiments, the connectivity module operates in conjunction with a wireless charging module. In examples of this aspect, the display is an input/output device comprising a touchscreen.

In illustrative embodiments, the display and the connectivity module may collect information from the personal mobile device to develop one or more passenger profiles and/or the behind-surface display displays information collected from the personal mobile device and information regarding a vehicle within which the passenger connectivity device is disposed.

In illustrative embodiments, the connectivity module may connect to a plurality of personal mobile devices in succession/consecutively or simultaneously in accordance with examples of this aspect.

In illustrative embodiments, a modular infotainment system including a mounting subsystem having one or more fasteners, an interactive subsystem comprising one or more input/output (I/O) devices, one or more connections for operatively coupling a personal mobile device of a passenger to the modular infotainment system, and one or more connections to a power supply that supplies electrical power to the interactive subsystem. Further, the mounting subsystem is at least partially separable from the interactive subsystem.

In illustrative embodiments, the modular infotainment system may further include a bracket operatively attached to a vehicle seat and mounting the interactive subsystem thereto.

In illustrative embodiments, an existing vehicle may be retrofitted with the mounting subsystem and the interactive subsystem, and the interactive subsystem and the mounting subsystem may be modular.

In illustrative embodiments, the interactive subsystem and the mounting subsystem of this aspect are interchangeable with another interactive subsystem and another mounting subsystem of another modular infotainment system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
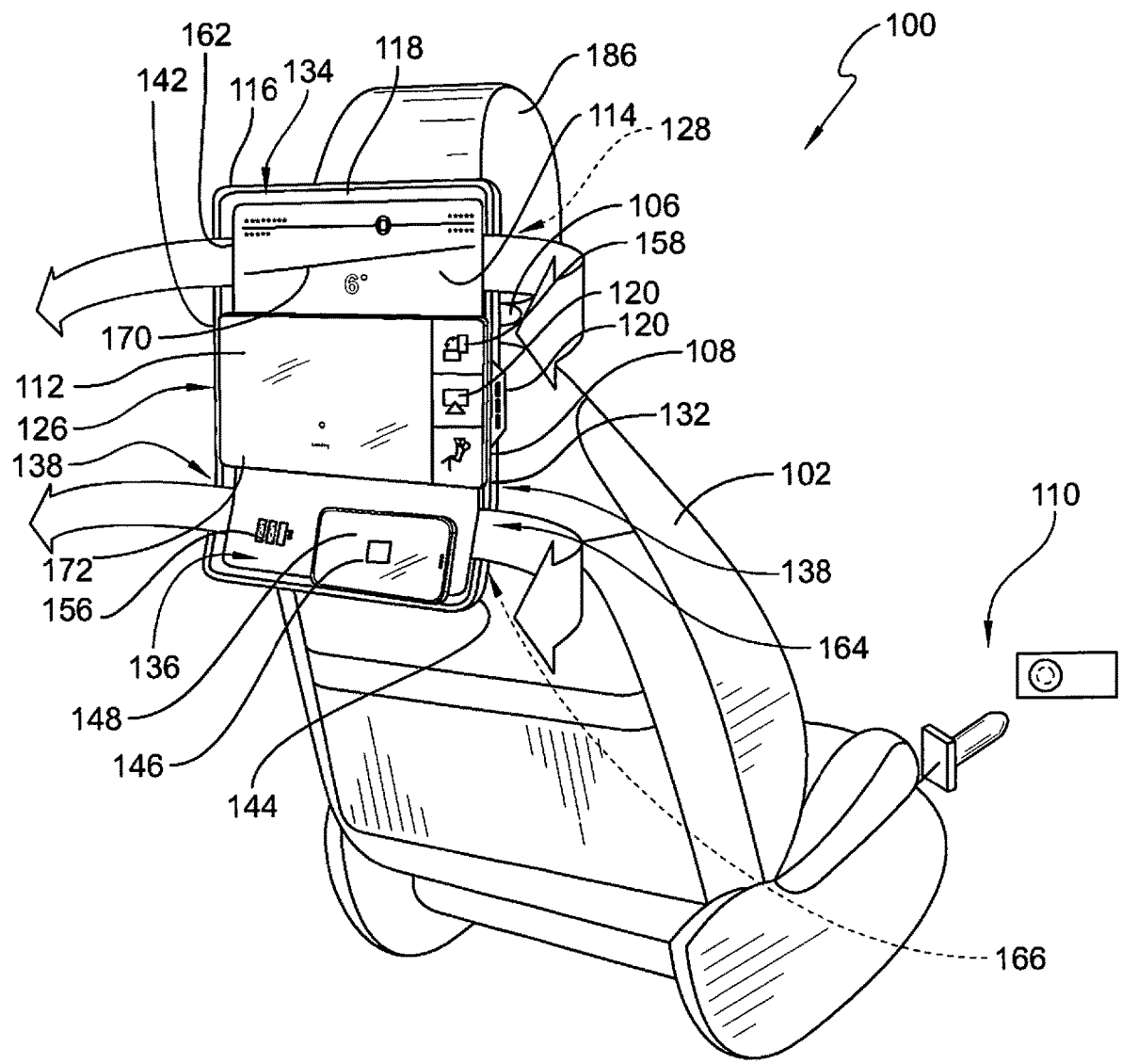
FIG. 1 illustrates an exemplary passenger infotainment system mounted on a vehicle seat.

The present disclosure details, with reference to FIGS. 1-5, a passenger infotainment system 100. Referring now to FIG. 1, the passenger infotainment system 100 is mounted to a vehicle seat 102 of a vehicle 104. The passenger infotainment system 100 is focused on a passenger, or passenger (see FIG. 3), riding in another passenger vehicle seat (not shown) disposed behind and in general alignment with the vehicle seat 102. However, example embodiments contemplated by this disclosure may be mounted on a vehicle seat proximal the passenger. The vehicle 104 may be an automobile powered by an internal combustion engine, an electric vehicle, a train, an airplane, a bus, a boat/ship, or other suitable vehicle. According to alternative embodiments, the passenger infotainment system 100 may be in a different geographic location where connectivity and other multimedia functions are desirable for a passenger. For example, the passenger infotainment system 100 may be disposed in waiting spaces, lobbies, airports, bus stops, shopping areas, or other suitable locations.

The passenger infotainment system 100 comprises a mounting subsystem 106, an interactive subsystem 108, and a power supply 110. The mounting subsystem 106 and the interactive subsystem 108 are modular components and together with the power supply 110 represent a scalable system for installation of the passenger infotainment system 100 into a wide variety of vehicle makes and models.

Passenger-focused modules, features, and/or operations discussed herein throughout may be implemented, partially implemented, or differently implemented across a network of passenger infotainment systems 100 disposed within a plurality of suitable vehicles, given the modularity of the passenger infotainment system 100.

The interactive subsystem 108 comprises, in example embodiments, a main display 112, a behind-surface display 114, one or more audio transducers 116, one or more lighting elements 118, and one or more input/output (I/O) elements 120. The power supply 110 is electrically connected to the interactive subsystem 108 directly and/or through the mounting subsystem 106. The power supply 110 may be a vehicle electrical system accessed through an outlet, such as a cigarette lighter supplying 12V, a vehicle battery of an electric vehicle, and/or another suitable battery dedicated to providing power to the infotainment system 100. In embodiments, an electrical connection to a powered seat may provide the power supply 110.

The mounting subsystem 106 (see FIG. 4) mounts the interactive subsystem 108 to a headrest and/or a seatback of the vehicle seat 102. One or more fasteners 124 removably connect a panel 126 of the interactive subsystem 108 to a bracket 122 of the mounting subsystem 106 (e.g., the panel 126 and the interactive subsystem 108 are omitted from the view of FIG. 4). The fasteners 124 may be screws, clips, detents, and/or any other suitable fasteners that provide for attachment of a rear side 128 of the panel 126 to the bracket 122 of the mounting subsystem 106.

A passenger side 130 of the panel 126 is disposed opposite the rear side 128 of the panel 126 and is configured to generally face a passenger when the passenger is seated comfortably in another vehicle seat (e.g., a rear passenger seat, a second-row seat, a third-row seat, a rear van seat, and/or another suitable vehicle seat disposed behind a front row, behind a driver seat, or further toward the rear of a vehicle). In the example of FIG. 1, the panel 126 comprises a pivot point 132 that provides the panel 126 with an angular shape. A second, lower portion 136 of the panel 126 is disposed at an angle relative a first, upper portion 134. In a further example, the second portion 136 may be manipulated, such as by a passenger, to change the angle of the second portion 136 relative the first portion 134 at or along the pivot point 132. One or more rotatable connectors 138 may be disposed between and operatively couple the first portion 134 and the second portion 136 of the panel 126. In an embodiment, the connector(s) 136 may be first and second rotatable hinges disposed on first and second side edges 142, 144 of the panel 126 at the pivot point 132. The rotatable hinges may be spring hinges, barrel hinges, detent hinges, and/or other suitable connectors.

The display 112 and behind-surface display 114 are disposed on the passenger side 130 of the panel 126. The display 112 may be centrally located along the vertical expanse of the panel 126 and further extends horizontally from the first side edge 142 to the second side edge 144. The interactive subsystem 108 may provide for connection with, control by, and/or interoperability with one or more personal mobile devices 146 such as a smartphone, tablet, laptop computer, smart watch, wearable device, or the like, through a connectivity module of the interactive subsystem 108. The personal mobile device(s) 146 may be operably coupled with the display 112 by a wired or wireless connection and by one or more suitable protocol (e.g., Apple AirPlay™, Google Cast™, Discovery and Launch (DIAL), Bluetooth™, Universal Plug and Play (UPnP), Simple Service Discovery Protocol (SSDP), Miracast™, Wireless Display (WiDi), Intel Unite™, or a plurality of the like). In the exemplary embodiment of FIGS. 2 and 3, the display 112 mirrors display(s) 148 of the personal mobile device(s) 146.

In addition to mirroring and/or casting of content from the personal mobile device(s) 146, the display 112 and the interactive subsystem 108 may be controlled and interacted with by a passenger through the personal mobile device 146 of the passenger. For example, the personal mobile device(s) 146 may control the interactive subsystem 108 while displaying different content or otherwise not mirroring or casting. The behind-surface display 114, the one or more audio transducers 116, and/or the one or more lighting elements 118 may further be controlled by the coupled personal mobile device(s) 146 in addition to, or alternatively to, control of the display 112. In further exemplary embodiments, more than one personal mobile device may be paired with the infotainment system 100 and facilitate interaction with and control of the interactive subsystem 108 through a plurality of the mobile devices 146 of one or more passengers. The mobile device(s) 146 may be successively or consecutively connected to the infotainment system 100 to provide control thereof. In the exemplary embodiment rideshare passengers enter and exit the vehicle 102 consecutively connecting their mobile device(s) 146, one after the other, during the operational course the rideshare vehicle. In another example, two or more passengers may connect the mobile devices 146 simultaneously to the interactive subsystem 108 to participate in a video game displayed on the display 112 while controls for said video game are displayed on the personal mobile devices 146.

The interactive subsystem 108 may further comprise one or more microprocessors 150. A local operating system (OS) may be implemented by the one or more microprocessors for facilitation and delivery of multimedia content when the mobile device(s) 146 are not coupled to the interactive subsystem 108. In exemplary embodiments, the local operating system and the one or more microprocessors 150 may execute local features such as welcome messages, games, presentation of multimedia (e.g., television programs, movies, webcasts, etc.), connectivity features (e.g., provisioning of wireless and/or cellular connection to the internet), online shopping, or payment and/or login information (e.g., collection, storage, and/or transmission of passenger credentials and payment information, such as a credit card or interaction with a mobile payment feature such as Apple Pay™, Google Wallet™, or the like). Exemplary embodiments contemplate connection with and use of the infotainment system 100 as a subscription service wherein a passenger may sign-up to use the systems 100 within a taxi or ridesharing service vehicle. As a result, it is further contemplated that presence of the infotainment system 100 amongst numerous other deployed infotainment systems may be viewable, searchable, and/or available for reservation within a mobile device application associated with ridesharing or ride hailing.

Also, in some embodiments, the infotainment system 100 may be operatively coupled to one or more systems of the vehicle 104 such as climate control, a vehicle audio system, vehicle navigation functions, seat controls, window controls, or other vehicle-level systems. This interconnection may be facilitated specifically by the one or more microprocessors 150 operating as a communication or connectivity module or in conjunction with one or more communication or connectivity modules. In certain embodiments, the one or more microprocessors 150 may include the one or more communication/connectivity modules for transmitting and receiving commands and information with vehicle-level systems, with the personal mobile device(s) 146, with remote servers, and/or with other systems supporting delivery of an infotainment service (e.g., banking institutions, navigation/GPS servers/satellites, etc.).

The behind-surface display 114 may be disposed about the main display 112. In exemplary embodiments, the behind-surface display 114 is behind, or underneath, the main display 112 relative a passenger seated comfortably in a rear passenger seat (not shown). In the example illustrated by FIGS. 1-3 and 5, the behind-surface display 114 may have a non-traditional display surface 152 or a surface that contrasts with a display surface of the main display 112. This feature may assist passengers in concentrating on the main display 112, when desired, or decrease distraction and increase the aesthetic appeal of the infotainment system 100. The non-traditional display surface 152 may comprise a fabric or fabric-like covering, texturing, or surface roughening. Various features may be displayed simultaneously or consecutively on the behind-surface display 114 including trip status information, motion sickness mitigation graphics 170, weather information, clock/time information, charging information for the coupled mobile device(s) 146, volume information for the audio transducer(s) 116, brightness and/or hue information for the one or more lighting elements 118, driver information, rideshare service information, passenger profile information, and/or other suitable information or display features. The lighting elements 118 may be embedded within the behind-surface display 114, along a perimeter of the panel 126, and/or on the rear side 128 of the panel 126. Additionally, the motion sickness mitigation graphics 170 may comprise information about the exterior horizon line. A numerical degree indicating a tilt of the vehicle 102 relative the horizon may be presented while one or more lines indicating a tilt of the vehicle 102 relative the exterior horizon may be displayed as a horizon indication graphic.

Figure 2:
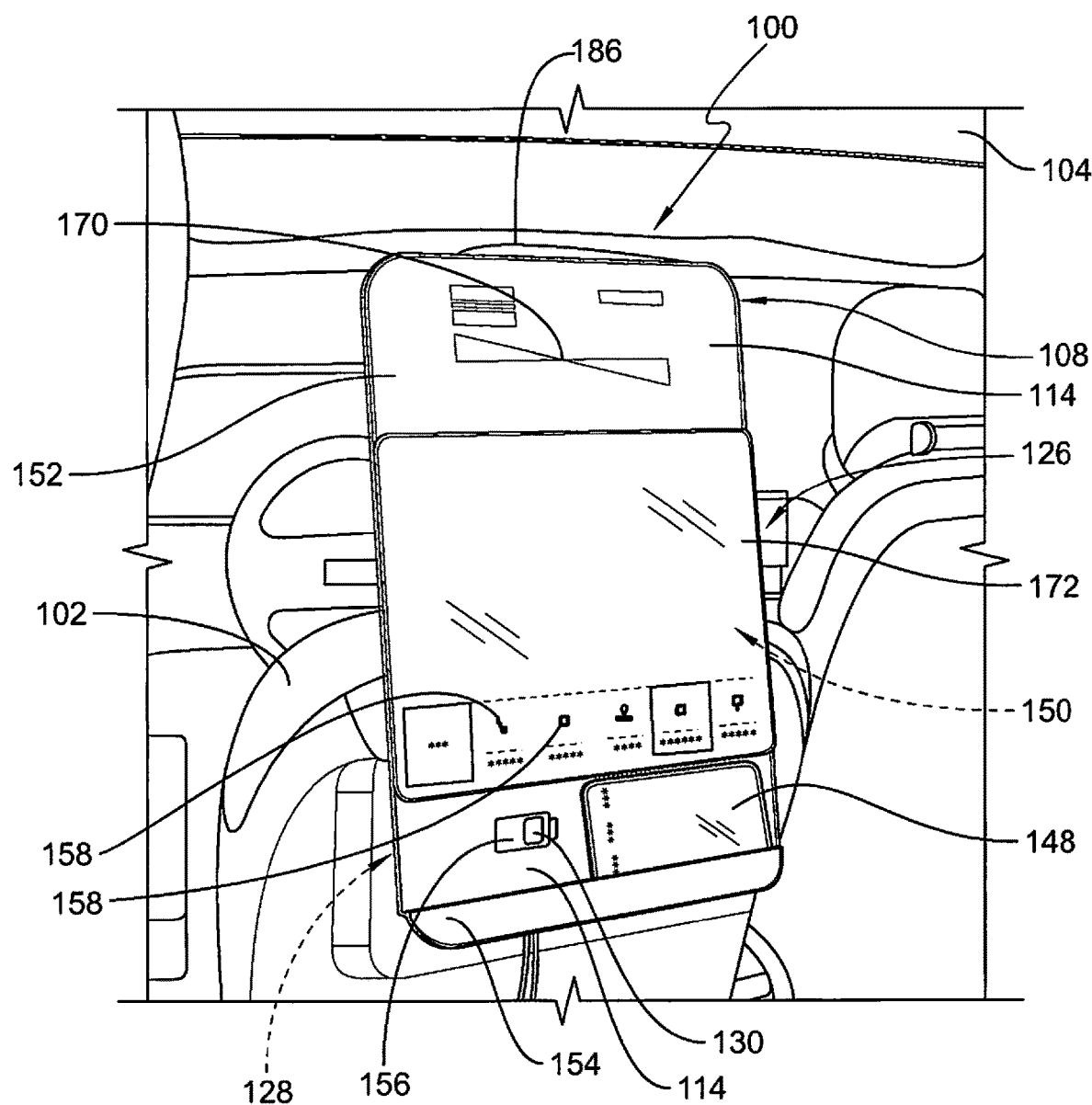
FIG. 2 illustrates an exemplary passenger infotainment system mounted on a driver-side front seat of an automobile coupled with a personal mobile device.
Figure 3:
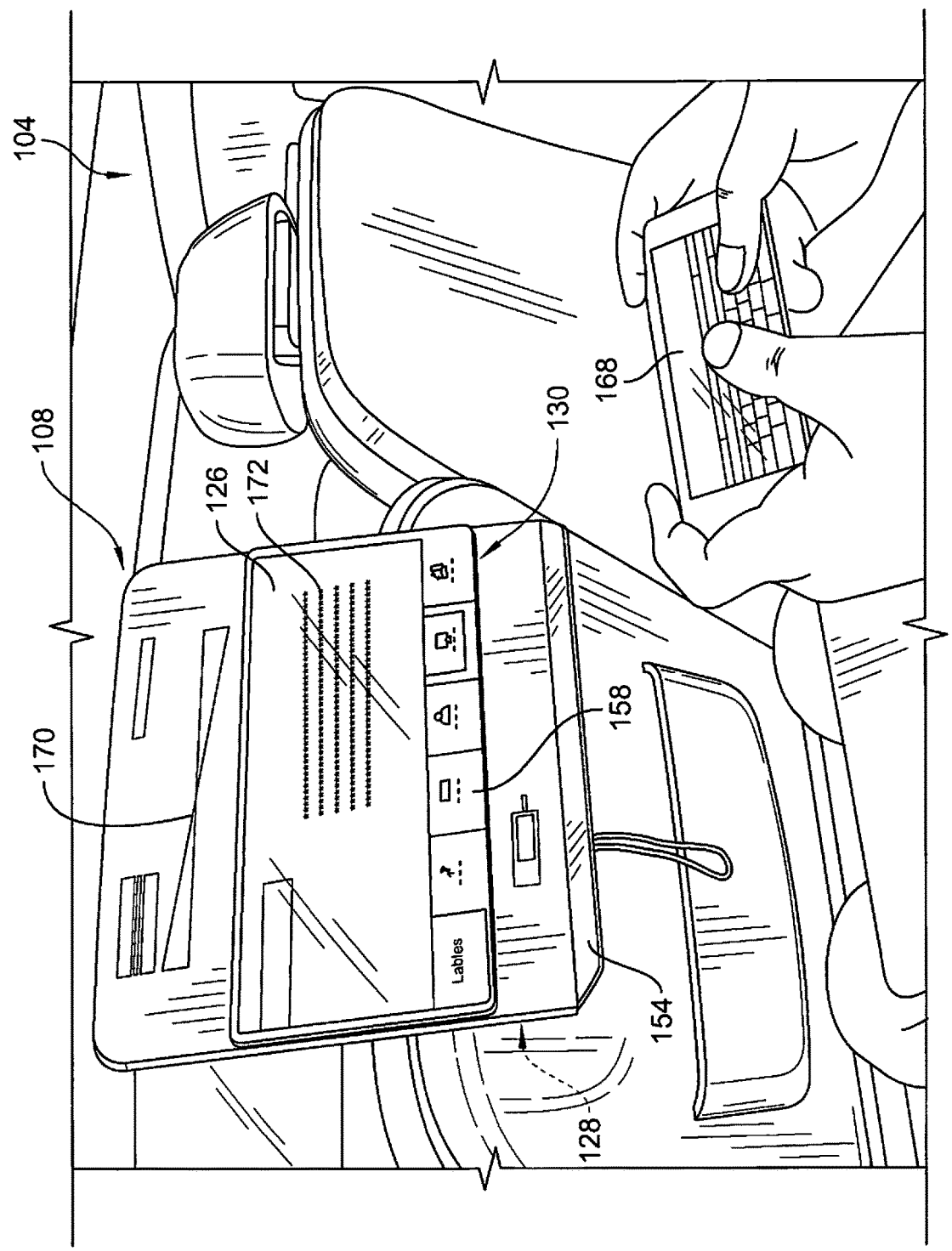
FIG. 3 illustrates the exemplary passenger infotainment system of FIG. 2 coupled with and subject to the control of the personal mobile device during operation of the personal mobile device by a passenger seated in a passenger seat.
Figure 4:
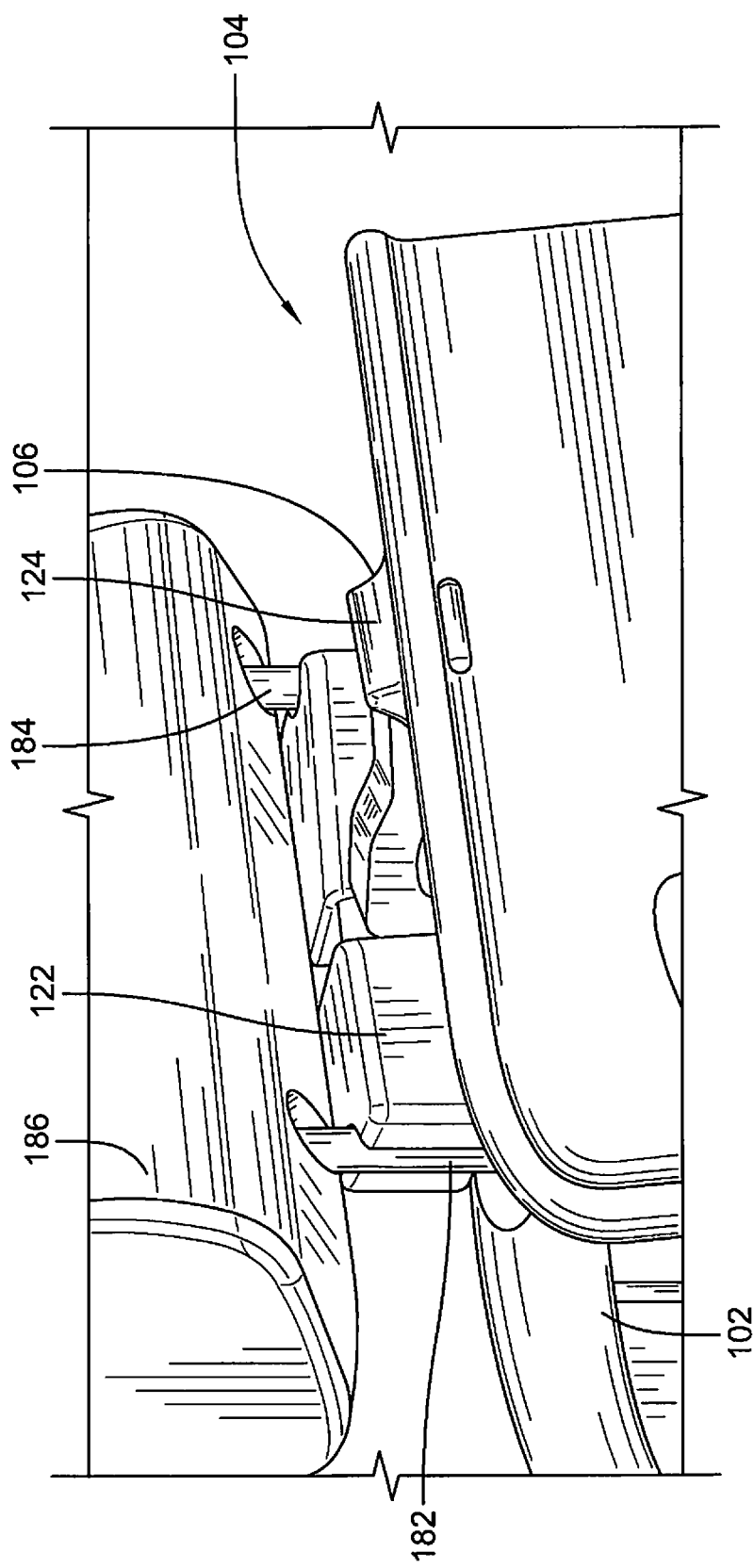
FIG. 4 illustrates a modular mounting apparatus for the passenger infotainment system of FIGS. 2 and 3.

Referring now to FIG. 2, the personal mobile device(s) 146 may be placed on a flange 154 extending outward from the second, lower portion 136 of the panel 126. The flange 154 may provide mechanical support to the personal mobile device(s) 146 while facilitating battery charging for the personal mobile device(s) 146. One or more charging module 156 may be disposed within the infotainment system 100 such as, for example, within the second, lower portion 136 of the panel 126. In exemplary embodiments, the charging module(s) 156 may be wireless and charge the personal mobile device(s) 146 through the passenger side 130 of the panel 126. Wired and wireless charging connections may both be included in the same embodiment of the infotainment system 100. Embodiments may further include one or more I/O port or device (e.g., a USB port, a VGA port, an HDMI port, a Lightning connector, USB-C connection, and/or other suitable connections or I/O ports). In some examples, a wired or wireless keyboard may be amongst the components of the interactive subsystem 108. Inclusion of a keyboard may be desirable for productivity purposes, such as operating and interacting with productivity services, applications, etc. through the main display 112. The personal mobile device(s) 146 may display a keyboard 168 for use in interacting with the infotainment system 100, but certain embodiments also contemplate a physical keyboard. A physical keyboard may be formed in the second, lower portion 136 of the panel 126, mounted inside or behind the panel 126, or along the flange 154.

The main display 112 and/or the behind-surface display 114 may further facilitate input and output of the infotainment system 100 by including thereon touch screen surfaces or segments of touch responsive surface. One or more virtual or physical buttons may be included as part of the interactive subsystem 108. In the exemplary embodiment of FIGS. 2 and 3, one or more virtual buttons 158 are disposed along a touchscreen 172 of the main display 112. The one or more virtual buttons 158 may facilitate a connection request, control volume of the one or more audio transducers 116, control the lighting elements 118, control the brightness and/or operation status of one or both of the main display 112 and the behind-surface display 114 (i.e., power on/off), or otherwise facilitate interaction of a passenger with the interactive subsystem 108.

In further examples, the one or more audio transducers 116 may comprise one or more sound surfaces 160. The one or more sound surfaces 160 may overlap with and/or be coextensive with all or a portion of the behind-surface display 114. For example, sonic vibration of a surface forming the behind-surface display 114 may emit sound. Accordingly, surfaces of the panel 126, such as surfaces of the first and second portions 134, 136 of the panel 126 may comprise the one or more audio transducers 116 and direct sound towards a passenger.

The embodiments shown in FIGS. 1-3 and 5 may be operated to increase the comfort of a passenger and manipulate the immediate environment as desired. Examples also include a ventilation subsystem 162 comprising ventilation elements including one or more fans 164 and one or more cooling/heating elements 166 for directing climate-controlled air towards a passenger. The same, or another mechanism, may provide active or passive air purification. The lighting elements 118 may be controlled by a passenger to provide ambient lighting, such as by light emitting diode (LED) lighting elements arranged about a perimeter of the panel 126 or through screen glow (backlighting) of the behind-surface display 114. The lighting elements 118 may be one or more light emitting diodes (LEDs), organic light emitting diodes (OLEDs), and/or other suitable lighting elements. In further embodiments, the lighting elements 118 may be controlled by a passenger to provide general lighting, task lighting, or accent lighting. Combined control of the ventilation subsystem 162, the lighting element(s) 118, and/or the audio transducer(s) 116 may develop a customizable environment for the passenger.

Figure 5:
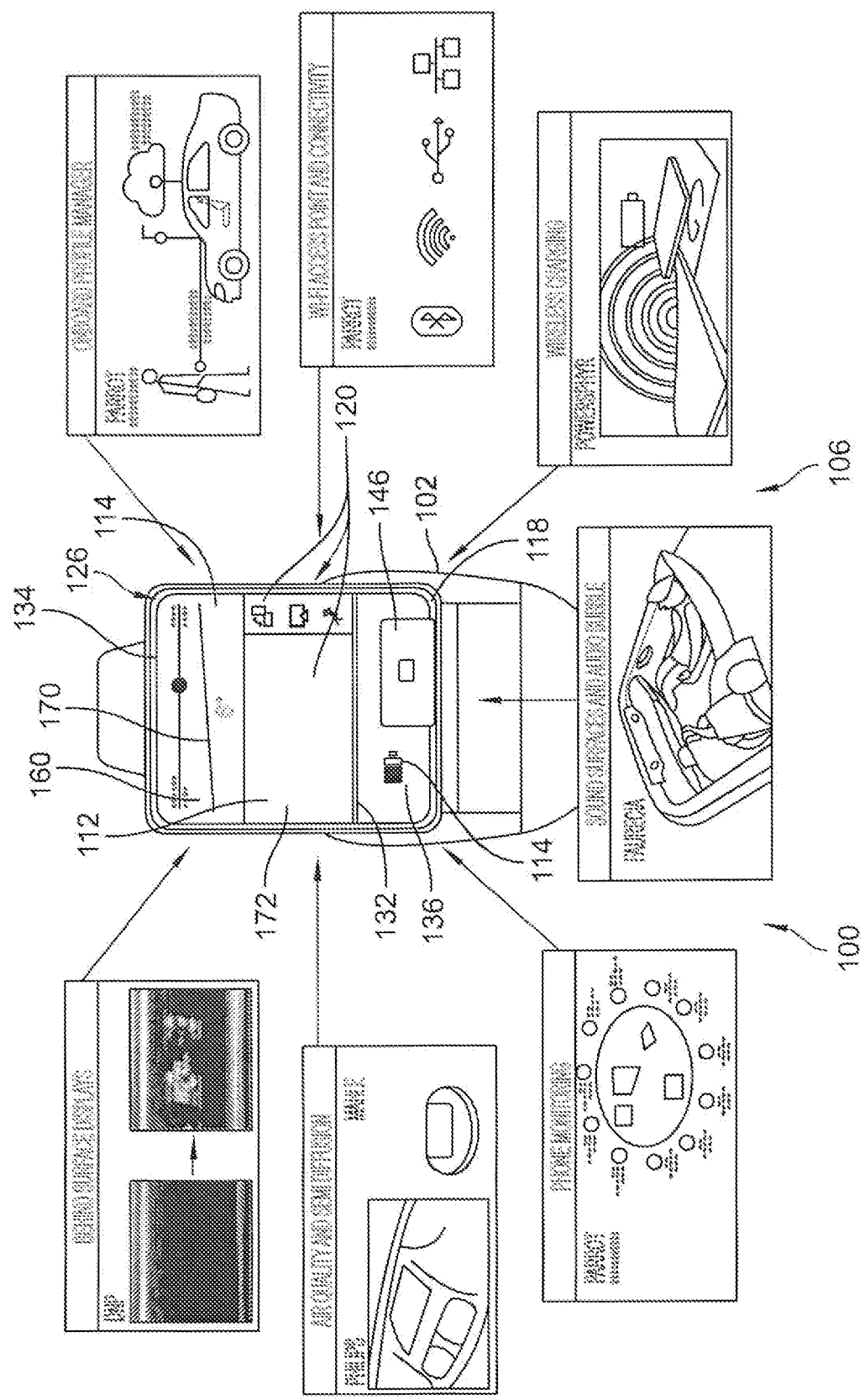
FIG. 5 illustrates several interoperable systems and devices facilitated by the passenger infotainment system of FIGS. 1-3.

Referring now to FIG. 5, several functions and operations facilitated by the infotainment system 100 are illustrated. A Parrot P7™ multimedia processor is an example microprocessor for use with the infotainment system 100 that has a relatively low cost and low power consumption. Exemplary passenger-focused modules/operations of the infotainment system 100 may comprise facilitating behind-surface displays of particular information, interfacing and control of air quality equipment and/or scent effusion devices, mobile device mirroring, control of sound surfaces and/or development of an audio bubble about a passenger, wireless charging, provisioning of wireless connectivity and/or internet connection, and development of a passenger profile such as for subscription services.

The present disclosure contemplates a plug-and-play style apparatus or aftermarket solution for rideshare or transportation network providers, fleet owners, or individual/personal vehicles. Referring again to FIG. 4, the mounting subsystem 106 comprises the bracket 122 affixed between or across first and second posts 182, 184 of a headrest 186. The bracket 122 may be installed and removed without making structural changes to interior furnishings of the vehicle and, in certain embodiments, without connecting to vehicle-level systems. The infotainment system 100 may be a desirable solution for ridesharing drivers and/or companies seeking a passenger-centric productivity and entertainment system that is modularly configurable, replaceable, and interchangeable without dependence on vehicle size, style, etc. For example, the mounting subsystem 106 may be interchangeable with another mounting subsystem or modularly replaceable or interchangeable between vehicles. Additionally, the interactive subsystem 108, the main display 112, and/or the behind-surface display 114 may be modular and interchangeable such that these components may be substituted for replacement modular components or switched from one mounting subsystem to another.

Exemplary System Architecture

Architecturally, the representative technology may be deployed anywhere. Networking components, including network connections, between and amongst mobile devices of the passenger and servers in communication with the infotainment system 100 may be cellular network connections. This disclosure contemplates compatibility and advantage to be found with 5G networking components and connections becoming more often available along roadways.

Embodiments of the disclosed system 100 are described with reference to FIGS. 1-5. In certain aspects, the system 100 may be implemented using hardware or a combination of software and hardware, either by dedicated devices and networks or integrated into other computing resource(s) or distributed across a plurality of computing resources. Computing device(s) and networks implementing the system 100 and operatively connecting with the system 100 may be, for example, mobile computers, tablet computers (e.g., including e-book readers), mobile devices (e.g., a smartphone or personal digital assistant), video game consoles (e.g., Nintendo Switch™), or any other devices having appropriate processor, memory, and communications capabilities for gathering, storing, processing, and transmitting the data associated with the system 100, and more particularly with screen mirror technology.

The disclosed systems and methods can be implemented with a computer system, using, for example, software, hardware, or a combination of both, either in a dedicated microprocessor, or integrated into another entity, or distributed across multiple entities. An exemplary computer system includes a bus or other communication mechanism for communicating information, and a processor coupled with the bus for processing information. The processor may be locally or remotely coupled with the bus. By way of example, the computer system may be implemented with one or more processor. The processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The computer system also includes a memory, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to a bus for storing information and instructions to be executed by a processor.

According to one aspect of the present disclosure, the disclosed system can be implemented using a computer system in response to a processor executing one or more sequences of one or more instructions contained in memory. Such instructions may be read into memory from another machine-readable medium, such as data storage device. One or more processors in a multi-processing arrangement may also be employed to execute the sequences of instructions contained in memory. In alternative implementations, hard-wired circuitry may be used in place of or in combination with software instructions to implement various implementations of the present disclosure. Thus, implementations of the present disclosure are not limited to any specific combination of hardware circuitry and software. According to one aspect of the disclosure, the disclosed system can be implemented using one or many remote elements in a computer system (e.g., cloud computing), such as a processor that is remote from other elements of the exemplary computer system described above.

In-vehicle entertainment, or infotainment, often refers to hardware and software in automobiles that provides audio or video entertainment and/or vehicle information. Conventional in-vehicle entertainment includes car audio systems such as radios and cassette or CD players. Such systems have evolved to include automotive navigation systems, video players, and computer/mobile device connectivity (e.g., in-vehicle WiFi™, Bluetooth™, or other connectivity). In-vehicle entertainment systems can include steering wheel audio controls and hands-free voice control.

Some in-vehicle entertainment systems have been focused primarily on a driver of the vehicle. The primary controls and input/output (I/O) components of in-vehicle entertainment systems have been disposed in the dashboard according to a cockpit-style. Other control and I/O locations include the center console, on the steering wheel, and/or projected in front of the driver in the style of the so-called "heads-up" display. These in-vehicle entertainment systems overlook passengers of the vehicle; or, at best, considered passengers only in relation to the driver (e.g., facilitating driver control of whole-vehicle systems, such as audio or climate control). While the driver may have been the focus of most vehicle systems, i.e., systems designed for operation by the driver and for increasing comfort for the driver during vehicle operation. Nevertheless, a focus on the cockpit, and the driver more generally, may be less desirable considering the expanding influence of ridesharing and autonomous vehicles on the automobile industry. Therefore, a passenger focused in-vehicle entertainment system in accordance with the present disclosure addresses needs and desires of occupants other than the driver.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The present disclosure includes devices, systems, and methods for providing a modular, interchangeable, passenger-focused infotainment system.

The following numbered clauses include embodiments that are contemplated and non-limiting:

Clause 1. An infotainment system comprising at least one display mounted to a vehicle seat.

Clause 2. The infotainment system of clause 1, any other clause, or any combination of clauses, further comprising a connectivity module that operably couples the infotainment system to at least one mobile device.

Clause 3. The infotainment system of clause 2, any other clause, or any combination of clauses, wherein the at least one display mirrors a display of the at least one mobile device.

Clause 4. The infotainment system of clause 3, any other clause, or any combination of clauses, further comprising a plurality of passenger-focused modules.

Clause 5. The infotainment system of clause 4, any other clause, or any combination of clauses, wherein the passenger-focused modules operate in response to the at least one mobile device via the connectivity module.

Clause 6. The infotainment system of clause 5, any other clause, or any combination of clauses, further comprising a secondary display configured as a behind-surface display.

Clause 7. The infotainment system of clause 6, any other clause, or any combination of clauses, wherein the secondary display provides at least one of trip information, charging information, and horizon information.

Clause 8. The infotainment system of clause 6, any other clause, or any combination of clauses, wherein the secondary display implements a motion sickness mitigation graphic.

Clause 9. The infotainment system of clause 6, any other clause, or any combination of clauses, further comprising at least one additional feature comprising: one or more lighting elements, one or more audio transducers, and one or more ventilation elements.

Clause 10. The infotainment system of clause 9, any other clause, or any combination of clauses, wherein the at least one mobile device controls the at least one additional feature through a wireless connection established by the connectivity module.

Clause 11. The infotainment system of clause 10, any other clause, or any combination of clauses, wherein the connectivity module further establishes a connection with at least one vehicle-level system.

Clause 12. The infotainment system of clause 11, any other clause, or any combination of clauses, wherein the at least one mobile device controls both the at least one additional feature and the at least one vehicle-level system.

Clause 13. A passenger connectivity device comprising a display mounted on a seat.

Clause 14. The passenger connectivity device of clause 13, any other clause, or any combination of clauses, further comprising a connectivity module that operatively connects a personal mobile device to the display.

Clause 15. The passenger connectivity device of clause 14, any other clause, or any combination of clauses, further comprising a behind-surface display disposed about the display.

Clause 16. The passenger connectivity device of clause 15, any other clause, or any combination of clauses, further comprising at least one processor that operates to mirror the personal mobile device on the display and present multimedia on the behind-surface display.

Clause 17. The passenger connectivity device of clause 16, any other clause, or any combination of clauses, wherein the connectivity module operates in conjunction with a wireless charging module.

Clause 18. The passenger connectivity device of clause 16, any other clause, or any combination of clauses, wherein the display is an input/output device comprising a touchscreen.

Clause 19. The passenger connectivity device of clause 18, any other clause, or any combination of clauses, wherein the display and the connectivity module collect information from the personal mobile device to develop one or more passenger profiles.

Clause 20. The passenger connectivity device of clause 19, any other clause, or any combination of clauses, wherein the behind-surface display displays information collected from the personal mobile device and information regarding a vehicle within which the passenger connectivity device is disposed.

Clause 21. The passenger connectivity device of clause 16, any other clause, or any combination of clauses, wherein the connectivity module connects to a plurality of personal mobile devices in succession.

Clause 22. The passenger connectivity device of clause 16, any other clause, or any combination of clauses, wherein the connectivity module connects to a plurality of personal mobiles devices simultaneously.

Clause 23. A modular infotainment system comprising a mounting subsystem comprising one or more fasteners.

Clause 24. The modular infotainment system of clause 23, any other clause, or any combination of clauses, further comprising an interactive subsystem comprising one or more input/output (I/O) devices.

Clause 25. The modular infotainment system of clause 24, any other clause, or any combination of clauses, wherein the mounting subsystem is at least partially separable from the interactive subsystem.

Clause 26. The modular infotainment system of clause 25, any other clause, or any combination of clauses, further comprising one or more connections for operatively coupling a personal mobile device of a passenger to the modular infotainment system; and Clause 27. The modular infotainment system of clause 26, any other clause, or any combination of clauses, further comprising one or more connections to a power supply that supplies electrical power to the interactive subsystem.

Clause 28. The modular infotainment system of clause 27, any other clause, or any combination of clauses, further comprising a bracket operatively attached to a vehicle seat and mounting thereto the interactive subsystem.

Clause 29. The modular infotainment system of clause 28, any other clause, or any combination of clauses, wherein an existing vehicle is retrofitted with the mounting subsystem and the interactive subsystem.

Clause 30. The modular infotainment system of clause 28, any other clause, or any combination of clauses, wherein the interactive subsystem and the mounting subsystem are modular.

Clause 31. The modular infotainment system of clause 30, any other clause, or any combination of clauses, wherein the interactive subsystem and the mounting subsystem are interchangeable with another interactive subsystem and another mounting subsystem of another modular infotainment system.

The embodiment(s) described above may be combined in full or in part, with any alternative embodiment(s) described.

What is claimed is:

1. An infotainment system, comprising:
   at least one display mounted to a vehicle seat;
   a connectivity module that operably couples the infotainment system to at least one mobile device;

wherein the at least one display mirrors a display of the at least one mobile device and wherein the at least one display comprises a first surface having a smooth texture;
a plurality of passenger-focused modules;
wherein the passenger-focused modules operate in response to the at least one mobile device via the connectivity module; and
a secondary display configured as a behind-surface display, wherein the secondary display comprises a second surface having a texture that contrasts with the smooth texture of the first surface, and wherein the secondary display provides at least one of trip information, charging information, and horizon information.

2. The infotainment system of claim 1, wherein the secondary display implements a motion sickness mitigation graphic.

3. The infotainment system of claim 1, further comprising at least one additional feature comprising: one or more lighting elements, one or more audio transducers, and one or more ventilation elements.

4. The infotainment system of claim 3, wherein the at least one mobile device controls the at least one additional feature through a wireless connection established by the connectivity module.

5. The infotainment system of claim 4, wherein the connectivity module further establishes a connection with at least one vehicle-level system.

6. The infotainment system of claim 5 wherein the at least one mobile device controls both the at least one additional feature and the at least one vehicle-level system.

7. The infotainment system of claim 1, wherein the connectivity module operates in conjunction with a wireless charging module.

8. The infotainment system of claim 1, wherein the at least one display is an input/output device comprising a touchscreen.

9. The infotainment system of claim 1, wherein the display and the connectivity module collect information from the at least one mobile device to develop one or more passenger profiles.

10. The infotainment system of claim 9, wherein the behind-surface display displays information collected from the at least one mobile device and information regarding a vehicle within which the infotainment system is disposed.

11. The infotainment system of claim 1, wherein the connectivity module connects to a plurality of mobile devices in succession.

12. The infotainment system of claim 1, wherein the connectivity module connects to a plurality of mobile devices simultaneously.

13. The infotainment system of claim 1, further comprising one or more connections to a power supply that supplies electrical power to the infotainment system.

14. The infotainment system of claim 13, wherein an existing vehicle is retrofitted with the infotainment system.

15. The infotainment system of claim 1, wherein the infotainment system comprises at least one of modular components and interchangeable components.

* * * * *